US011252100B2

(12) United States Patent
Sitaraman et al.

(10) Patent No.: US 11,252,100 B2
(45) Date of Patent: *Feb. 15, 2022

(54) APPARATUS, SYSTEM, AND METHOD FOR PROVIDING NODE PROTECTION ACROSS LABEL-SWITCHED PATHS THAT SHARE LABELS

(71) Applicant: Juniper Networks, Inc., Sunnyvale, CA (US)

(72) Inventors: Harish Sitaraman, Sunnyvale, CA (US); Raveendra Torvi, Sunnyvale, CA (US); Vishnu Pavan Beeram, Sunnyvale, CA (US); Chandrasekar Ramachandran, Sunnyvale, CA (US)

(73) Assignee: Juniper Networks, Inc, Sunnyvale, CA (US)

( * ) Notice: Subject to any disclaimer, the term of this patent is extended or adjusted under 35 U.S.C. 154(b) by 201 days.

This patent is subject to a terminal disclaimer.

(21) Appl. No.: 16/577,864

(22) Filed: Sep. 20, 2019

(65) Prior Publication Data

US 2020/0021535 A1 Jan. 16, 2020

Related U.S. Application Data

(63) Continuation of application No. 15/688,813, filed on Aug. 28, 2017, now Pat. No. 10,476,811.

(30) Foreign Application Priority Data

Mar. 10, 2017 (IN) .............................. 201711008473

(51) Int. Cl.
*H04L 12/707* (2013.01)
*H04L 12/733* (2013.01)
(Continued)

(52) U.S. Cl.
CPC ............ *H04L 47/728* (2013.01); *H04L 45/22* (2013.01); *H04L 45/28* (2013.01); *H04L 45/50* (2013.01); *H04L 47/825* (2013.01); *H04L 47/724* (2013.01)

(58) Field of Classification Search
CPC ....... H04L 47/728; H04L 45/50; H04L 45/22; H04L 45/28; H04L 45/20; H04L 47/825; H04L 47/724; H04L 45/52
(Continued)

(56) References Cited

U.S. PATENT DOCUMENTS

| 9,077,660 B1* | 7/2015 | Zhou | H04L 45/00 |
| 2002/0112072 A1* | 8/2002 | Jain | H04L 45/22 709/239 |

(Continued)

*Primary Examiner* — Edan Orgad
*Assistant Examiner* — Vanneilian Lalchinthang
(74) *Attorney, Agent, or Firm* — FisherBroyles, LLP

(57) ABSTRACT

The disclosed computer-implemented method may include (1) receiving, at a network node within a network, a packet from another network node within the network, (2) identifying, within the packet, a label stack that includes a plurality of labels that collectively represent at least a portion of a label-switched path within the network, (3) popping, from the label stack, a label that corresponds to a next hop of the network node, (4) determining, based at least in part on the label, that the next hop has experienced a failure that prevents the packet from reaching a destination via the next hop, (5) identifying a backup path that merges with the label-switched path at a next-to-next hop included in the label-switched path, and then (6) forwarding the packet to the next-to-next hop via the backup path. Various other methods, systems, and apparatuses are also disclosed.

19 Claims, 9 Drawing Sheets

(51) Int. Cl.
*H04L 12/911* (2013.01)
*H04L 12/703* (2013.01)
*H04L 12/723* (2013.01)
*H04L 12/913* (2013.01)

(58) Field of Classification Search
USPC .......................................................... 370/218
See application file for complete search history.

(56) References Cited

U.S. PATENT DOCUMENTS

| | | | | |
|---|---|---|---|---|
| 2004/0246972 | A1* | 12/2004 | Wang | H04L 47/14 |
| | | | | 370/395.5 |
| 2005/0201273 | A1* | 9/2005 | Shimizu | H04L 45/50 |
| | | | | 370/216 |
| 2008/0186951 | A1* | 8/2008 | Hirota | H04L 45/02 |
| | | | | 370/351 |
| 2011/0205885 | A1* | 8/2011 | Kini | H04L 12/437 |
| | | | | 370/217 |
| 2014/0177638 | A1* | 6/2014 | Bragg | H04L 45/507 |
| | | | | 370/395.5 |
| 2014/0280711 | A1* | 9/2014 | Asati | H04L 67/10 |
| | | | | 709/217 |
| 2014/0328163 | A1* | 11/2014 | Del Regno | H04L 45/28 |
| | | | | 370/225 |
| 2015/0244615 | A1* | 8/2015 | Esale | H04L 45/507 |
| | | | | 370/389 |
| 2016/0173366 | A1* | 6/2016 | Saad | H04L 45/20 |
| | | | | 370/218 |
| 2017/0111268 | A1* | 4/2017 | Swallow | H04L 45/00 |

* cited by examiner

APPARATUS, SYSTEM, AND METHOD FOR PROVIDING NODE PROTECTION ACROSS LABEL-SWITCHED PATHS THAT SHARE LABELS

CROSS REFERENCE TO RELATED APPLICATION

This application is a continuation of U.S. application Ser. No. 15/688,813 filed 28 Aug. 2017, the disclosure of which is incorporated, in its entirety, by this reference.

BACKGROUND

MultiProtocol Label Switching (MPLS) networks often include various paths that facilitate the flow of traffic from a source device to a destination device. In such MPLS networks, these paths may be identified and/or represented by a sequence of labels that correspond to different portions of the paths. For example, a packet may traverse a traditional MPLS network from a source device to a destination device. Along the way, the packet may arrive at an intermediary node that switches the packet's existing label for another label that corresponds to a subsequent hop within the LSP and then forwards the packet. Since labels are often switched in this way as packets traverse traditional MPLS networks, these paths may be referred to as Label-Switched Paths (LSPs).

LSPs may include and/or represent various nodes within a network. Each of these nodes may maintain and/or program both control plane and data plane state or data for the relevant LSPs. For example, a certain network node may represent a portion of 100,000 LSPs. In other words, 100,000 LSPs may include and/or pass through that network node.

In many traditional configurations, the number of data plane states maintained by a network node may be directly proportional to the number of LSPs that include that network node. In other words, such traditional configurations may require the data plane state to remain directly proportional to the control plane state. For example, in the event that a network node represents a portion of 100,000 LSPs, that network node may need to manage 100,000 different labels in the data plane by creating, updating, and/or deleting such labels when changes occur. As a result, the network node may be adding and/or deleting labels to the data plane on a nearly constant basis.

However, a newer MPLS technology may enable LSPs to share labels such that the number of labels needed to support the MPLS LSPs is reduced significantly. With this newer MPLS technology, rather than maintaining the same number of labels as the number of LSPs in the data plane, each network node may only need to maintain the same number of labels as the number of different next hops included in the LSPs.

As a specific example, the network node that represents a portion of 100,000 LSPs may interface with 10 other nodes that represent portions of those 100,000 LSPs. Rather than maintaining 100,000 labels in the forwarding table of the data plane, the network node may only need to maintain 10 different labels that correspond to the other nodes, thereby drastically reducing resource consumption and/or processing demands. As a result, the network node may be able to manage the labels in the forwarding table of the data plane without needing to perform updates so frequently.

Unfortunately, since the LSPs in this newer MPLS technology share labels, the network nodes included in these LSPs may be unable to provide node protection by way of traditional means. For example, the same label at the network node may correspond to 1,000 LSPs. Some of these LSPs that share the same label at the network node may have different merge points. In other words, in the event that the node identified by the shared label fails, the network node may have access to certain backup paths that merge back onto the LSPs downstream. However, since these LSPs share that label, the network node may be unable to determine which backup path to use for any given LSP in the event of a failure.

The instant disclosure, therefore, identifies and addresses a need for additional apparatuses, systems, and methods for providing node protection in LSPs that share labels.

SUMMARY

As will be described in greater detail below, the instant disclosure generally relates to apparatuses, systems, and methods for providing node protection across LSPs that share labels. In one example, a computer-implemented method for providing such node protection may include (1) receiving, at a network node within a network, a packet from another network node within the network, (2) identifying, within the packet, a label stack that includes a plurality of labels that collectively represent at least a portion of an LSP within the network, (3) popping, from the label stack, a label that corresponds to a next hop of the network node included in the LSP, (4) determining, based at least in part on the label, that the next hop has experienced a failure that prevents the packet from reaching a destination via the next hop, (5) identifying a backup path that (A) merges with the LSP at a next-to-next hop included in the LSP and (B) enables the packet to bypass the failed next hop and reach the destination, and then (6) forwarding the packet to the next-to-next hop via the backup path.

As another example, a system for implementing the above-described method may include various modules stored in memory. The system may also include at least one physical processor that executes these modules. For example, the system may include (1) a receiving module that receives a packet from another network node within the network, (2) an identification module that identifies, within the packet, a label stack that includes a plurality of labels that collectively represent at least a portion of a LSP within the network, (3) a label module that pops, from the label stack, a label that corresponds to a next hop of the network node included in the LSP, (4) a determination module that determines that the next hop has experienced a failure that prevents the packet from reaching a destination via the next hop, (5) wherein the identification module identifies a backup path that (A) merges with the LSP at a next-to-next hop included in the LSP and (B) enables the packet to bypass the failed next hop and reach the destination, and (6) a forwarding module that forwards the packet to the next-to-next hop via the backup path.

As a further example, an apparatus for implementing the above-described method may include at least one storage device that stores a plurality of labels that correspond to portions of LSPs within a network. In this example, the apparatus may also include at least one physical processing device communicatively coupled to the storage device within a network node, wherein the physical processing device (1) receives a packet from another network node within the network, (2) identifies, within the packet, a label stack that includes a plurality of labels that collectively represent at least a portion of a LSP within the network, (3)

pops, from the label stack, a label that corresponds to a next hop of the network node included in the LSP, (4) determines, based at least in part on the label, that the next hop has experienced a failure that prevents the packet from reaching a destination via the next hop, (5) identifies a backup path that (A) merges with the LSP at a next-to-next hop included in the LSP and (B) enables the packet to bypass the failed next hop and reach the destination, and then (6) forwards the packet to the next-to-next hop via the backup path.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
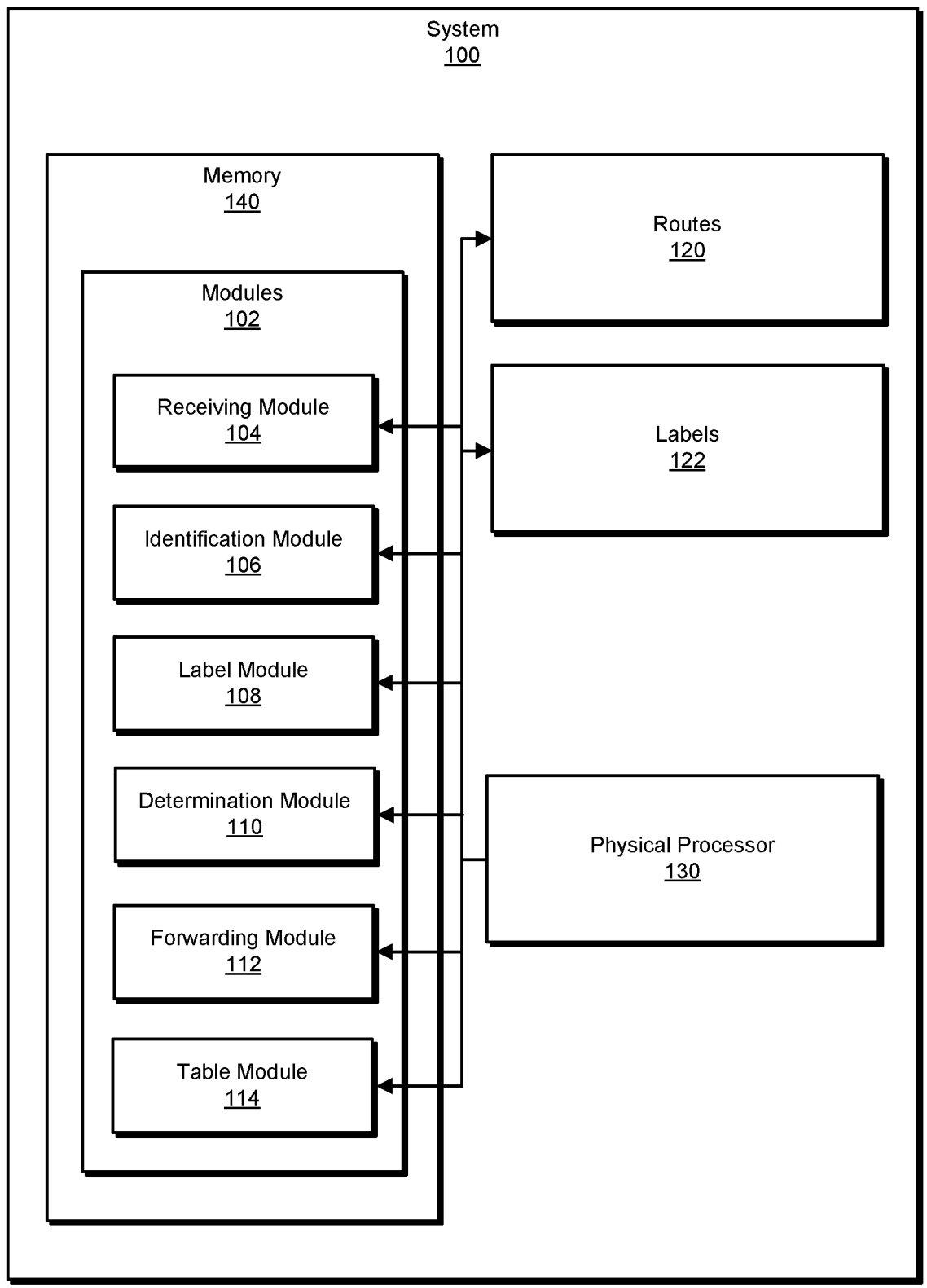
FIG. 1 is a block diagram of an exemplary system for providing node protection across LSPs that share labels.

Throughout the drawings, identical reference characters and descriptions indicate similar, but not necessarily identical, elements. While the exemplary embodiments described herein are susceptible to various modifications and alternative forms, specific embodiments have been shown byway of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure describes various apparatuses, systems, and methods for providing node protection across LSPs that share labels. As will be explained in greater detail below, embodiments of the instant disclosure may provide node protection at each hop within resource ReSerVation Protocol (RSVP)-Traffic Engineering (TE) LSPs that implement a pop-and-forward data plane. These embodiments may achieve such node protection by providing separate pop-and-forward labels for the backup paths at the hops within the protected LSPs.

Certain LSPs may include a combination of pop-and-forward labels and swap-and-forward labels. In this context, the term "pop-and-forward label" generally refers to a label that is simply removed from a label stack at an intermediary node of an LSP without being replaced by any new label. In contrast, the term "swap-and-forward label" generally refers to a label that is swapped for another label at an intermediary node of an LSP.

In some embodiments, the hops within protected LSPs may use context tables to resolve the correct backup path in the event of a failure. For example, RSVP-TE LSPs may record the Internet Protocol (IP) addresses and labels in the Record Route Object (RRO) in the reservation message. In this example, each hop may have a list of labels and IP addresses of all downstream hops. A Point of Local Repair (PLR) may represent a node that precedes and/or resides just upstream from a failed link or failed node within a protected LSP. In other words, a PLR may represent a node that is included in a protected LSP and whose next hop in the LSP has failed.

Continuing with this example, each PLR may create a context routing table per next hop node (as identified by the node identifier of the next hop included in the RRO in the reservation message) and then add the pop-and-forward labels included in RRO into the context table. In the event that the next hop of the LSP is functional, the PLR may simply pop the top label from a label stack that includes multiple labels and then forward the traffic to the next hop in the primary forwarding path. However, in the event that the next hop of the LSP has failed, the PLR may pop the top label of the label stack and then send this traffic to the context table for lookup. At the context table, the PLR may search for the label for the corresponding backup path based on the subsequent label in the label stack. The PLR may then pop this subsequent label from the label stack and forward the traffic to the next hop in the backup path. Upon receiving this traffic from the PLR, this next hop may forward the traffic to a merge point, which represents the node at which the backup path merges back with the primary forwarding path.

In other embodiments, the PLR may track the next hop identifier and the next-to-next hop identifier of an LSP based on the RRO in the reservation message. The merge point may include and/or represent the next-to-next hop from the PLR's perspective. The PLR may allocate a separate label for a tuple that includes the next hop identifier and the next-to-next hop identifier. In the event that the next hop of the LSP is functional, the PLR may simply pop the top label from the label stack and then forward the traffic to the next hop in the primary forwarding path. However, in the event that the next hop of the LSP has failed, the PLR may pop the top label and subsequent label of the label stack. The PLR may then find the backup path's top label and push the same onto the outgoing traffic. LSPs that have the same next hop and next-to-next hop from the perspective of the PLR may use and/or share the same forwarding label and backup path.

The following will provide, with reference to FIGS. 1, 2, 5, 7, and 8, detailed descriptions of exemplary systems for providing node protection across LSPs that share labels. Detailed descriptions of information that identifies different LSPs will be provided in connection with FIGS. 4 and 6. Detailed descriptions of corresponding computer-implemented methods will be provided in connection with FIG. 3. In addition, detailed descriptions of an exemplary computing system for carrying out these methods will be provided in connection with FIG. 9.

FIG. 1 is a block diagram of an exemplary system 100 for providing node protection across LSPs that share labels. As illustrated in this figure, exemplary system 100 may include one or more modules 102 for performing one or more tasks. As will be explained in greater detail below, modules 102 may include a receiving module 104, an identification module 106, a label module 108, a determination module 110, a forwarding module 112, and a table module 114. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, cause the computing device to perform one or more tasks. For example, and as will be described in greater detail below, one or more of modules 102 may represent modules stored and configured to run on one or more computing devices, such as the devices illustrated in FIG. 2 (e.g., network nodes 202 and/or 206), the devices illustrated in FIG. 5 (e.g., network nodes 202, 206, 502, 504, 512, 514, 516, and/or 518), the devices illustrated in FIG. 7 (e.g., network nodes 202, 206, 502, 504, 512, 514, 516, 518, and/or 712), and/or the devices illustrated in FIG. 8 (e.g., network nodes 820, 822, 824, 826, 828, 830, 832, 834, 836, 838, and/or 840). In addition, one or more of modules 102 may perform any of the functionality described herein in connection with any of the devices illustrated in FIG. 2, the devices illustrated in FIG. 5, the devices illustrated in FIG. 7, and/or the devices illustrated in FIG. 8. One or more of modules 102 in FIG. 1 may also represent all or portions of one or more special-purpose computers configured to perform one or more tasks.

As illustrated in FIG. 1, system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives, (HDDs), Solid-State Drives (SSDs), optical disk drives, caches, variations or combinations of one or more of the same, and/or any other suitable storage memory.

As illustrated in FIG. 1, system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate providing node protection across LSPs that share labels. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, exemplary system 100 may also include one or more routes, such as routes 120. In some examples, routes 120 may each identify at least a portion of a particular path (e.g., an LSP) within a network. In such examples, routes 120 may facilitate the flow of traffic within the network. Examples of routes 120 include, without limitation, Address Resolution Protocol (ARP) routes, prefixes, Internet Protocol (IP) routes, IP addresses, Media Access Control (MAC) addresses, variations or combinations of one or more of the same, and/or any other suitable routes.

Exemplary system 100 may further include one or more labels, such as labels 122. In some examples, labels 122 may include and/or represent MPLS labels. In such examples, labels 122 may be assigned and/or attached to traffic and/or individual packets. Labels 122 may indicate and/or correspond to at least a portion of a particular path within a network. Accordingly, routing and/or forwarding decisions may be determined and/or controlled by the particular labels assigned to a packet. For example, a router may receive a packet, identify one of the labels assigned to the packet, and then forward the packet to the next hop corresponding to that particular label.

Figure 2:
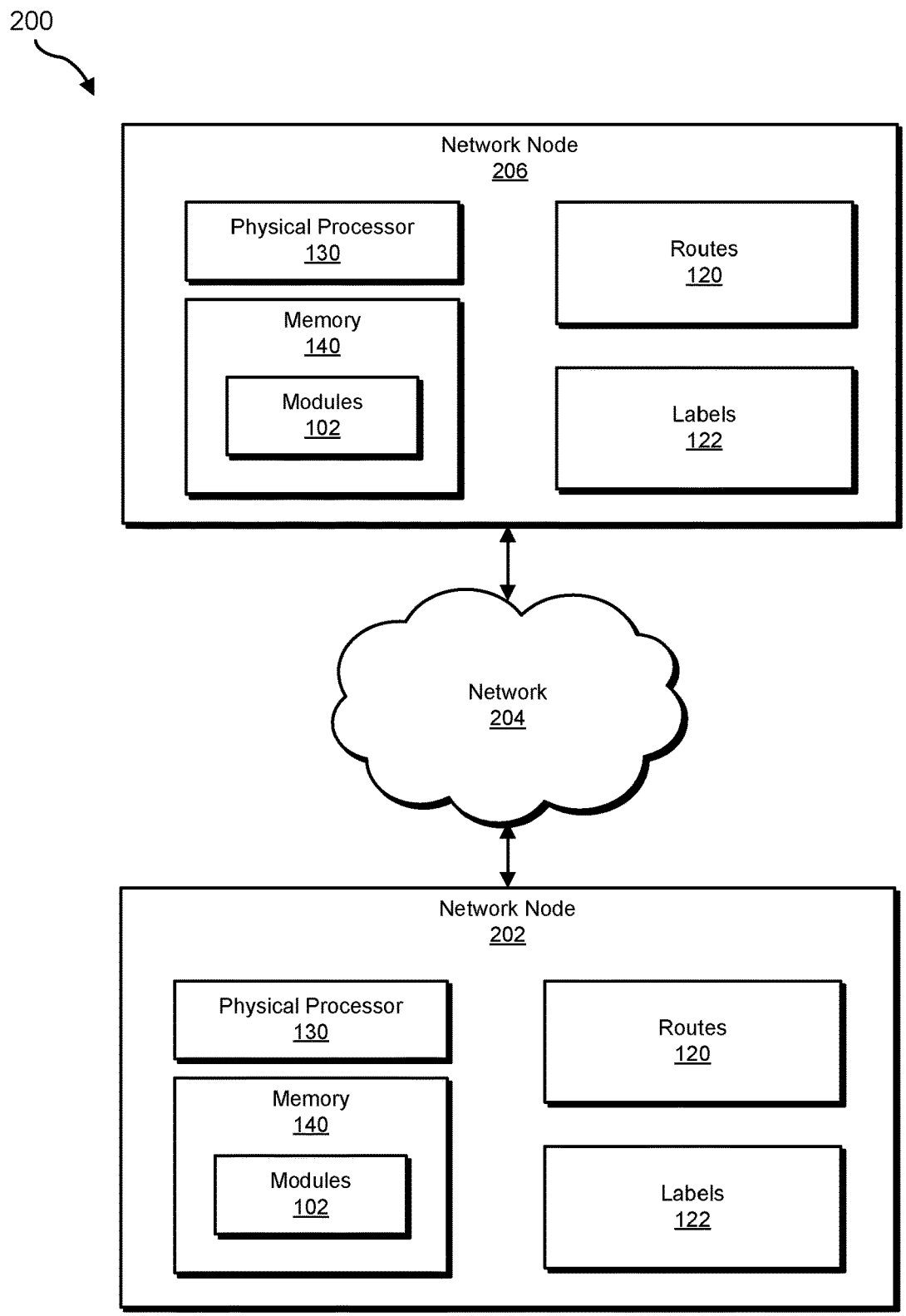
FIG. 2 is a block diagram of an additional exemplary system for providing node protection across LSPs that share labels.

Exemplary system 100 in FIG. 1 may be implemented in a variety of ways. For example, all or a portion of exemplary system 100 may represent portions of exemplary system 200 in FIG. 2. As shown in FIG. 2, system 200 may include a network node 202 in communication with a network node 206 via a network 204. In one example, all or a portion of the functionality of modules 102 may be performed by network node 202, network node 206, and/or any other suitable computing system. As will be described in greater detail below, one or more of modules 102 from FIG. 1 may, when executed by at least one processor of network node 202 or 206, enable network node 202 or 206 to share labels across LSPs within network 204.

Network nodes 202 and 206 each generally represent any type or form of physical computing device that facilitates communication within a network and/or across networks. In one example, network nodes 202 and 206 may each include and/or represent a router (such as a customer edge router, a provider edge router, a hub router, a spoke router, an autonomous system boundary router, and/or an area border router). Additional examples of network nodes 202 and 206 include, without limitation, switches, hubs, modems, bridges, repeaters, gateways, multiplexers, network adapters, network interfaces, servers, portions of one or more of the same, combinations or variations of one or more of the same, and/or any other suitable network nodes.

Network 204 generally represents any medium or architecture capable of facilitating communication or data transfer. In one example, network 204 may facilitate communication between network nodes 202 and 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), an MPLS network, a resource RSVP-TE network, portions of one or more of the same, variations or combinations of one or more of the same, and/or any other suitable network. Although illustrated as being external to network 204 in FIG. 2, network nodes 202 and 206 may each represent a portion of network 204 and/or be included in network 204.

Figure 3:
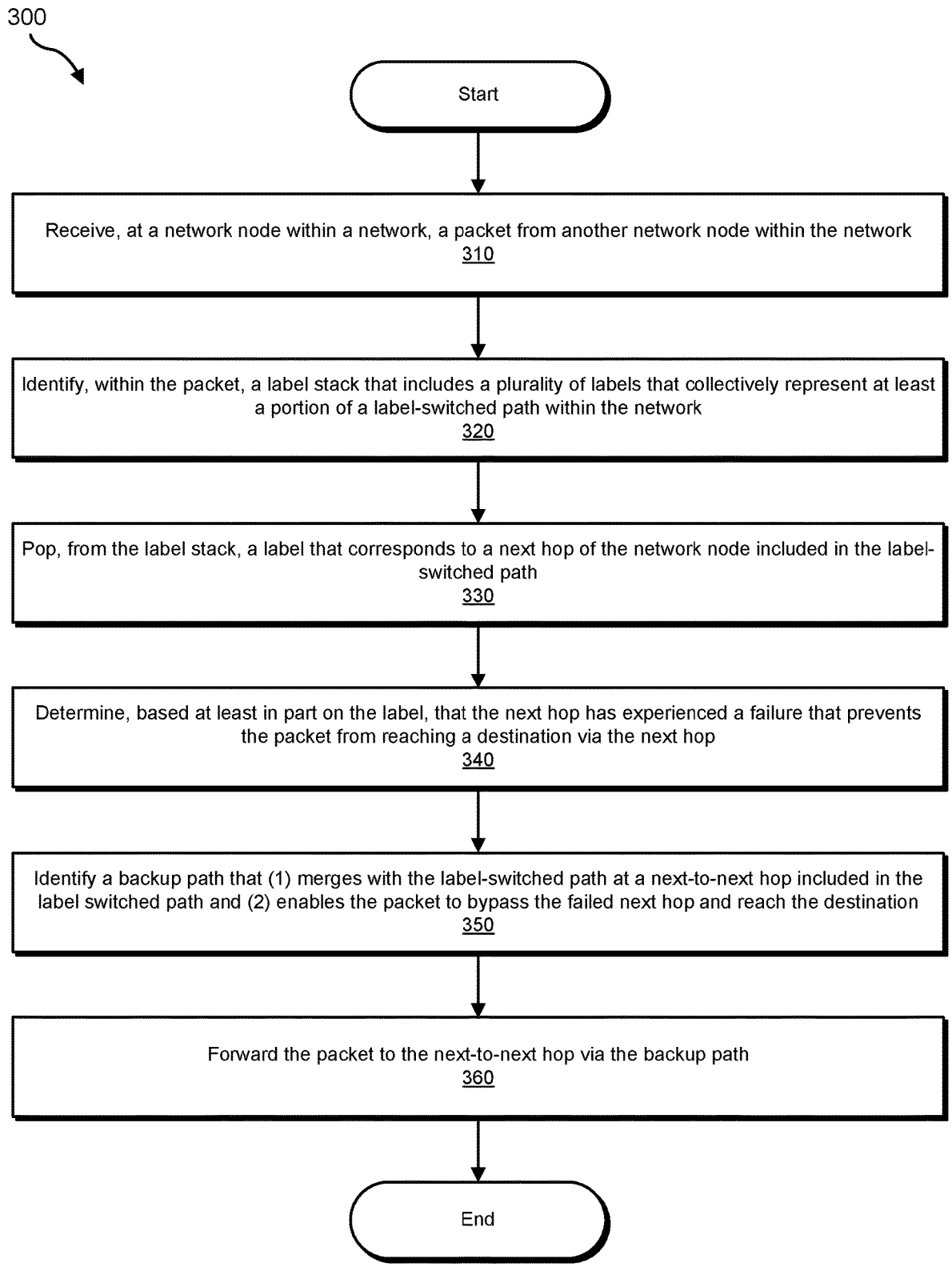
FIG. 3 is a flow diagram of an exemplary method for providing node protection across LSPs that share labels.

FIG. 3 is a flow diagram of an example computer-implemented method 300 for providing node protection across LSPs that share labels. The steps shown in FIG. 3 may be performed by any suitable computer-executable code and/or computing system, including system 100 in FIG. 1, system 200 in FIG. 2, system 500 in FIG. 5, system 700 in FIG. 7, system 800 in FIG. 8, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 310 one or more of the apparatuses and/or systems described herein may receive, at a network node within a network, a packet from another network node within the network. For example, receiving module 104 may, as part of network node 202 in FIG. 5 or 7, receive a packet from network node 504 in FIG. 5 or 7. In this example, network nodes 202 and 504 may represent and/or be included in the network of exemplary system 500 in FIG. 5 or exemplary system 700 in FIG. 7. The term "packet," as used herein, generally refers to any type or form of communication package, encapsulation, abstraction, and/or object that includes one or more formatted units of data.

The systems described herein may perform step 310 in a variety of different ways and/or contexts. In some examples, receiving module 104 may monitor traffic arriving at network node 202. While monitoring such traffic, receiving module 104 detect and/or receive an incoming packet from network node 504. In one example, the packet may have originated from network node 206. Alternatively, the packet may have originated at another device (e.g., network node 502 in FIG. 5) and then passed through network node 504 on the way to network node 202.

In one example, the packet may be destined for the Internet, which may be reached via network node 202. In another example, the packet may be destined for a home network and/or client device, which may be reached via network node 202.

Returning to FIG. 3, at step 320 one or more of the apparatuses and/or systems described herein may identify, within the packet, a label stack that includes a plurality of labels that collectively represent at least a portion of an LSP within the network. For example, identification module 106 may, as part of network node 202 in FIG. 5 or 7, identify a label stack within the packet. In this example, the label stack may include multiple labels that collectively represent at least a portion of an LSP within the network of exemplary system 500 in FIG. 5 or exemplary system 700 in FIG. 7. The term "label stack," as used herein, generally refers to any collection of labels that each identify a certain segment or link of an LSP.

The systems described herein may perform step 320 in a variety of different ways and/or contexts. In some examples, identification module 106 may search at least a portion of the packet for the label stack. For example, identification module 106 may locate the header of the packet and then begin searching the header for a label stack. In this example, while searching the header, identification module 106 may identify a label stack that includes multiple labels. Each label in the label stack may identify and/or represent a different link of the LSP being traversed by the packet.

In some examples, one or more of the systems described herein may establish and/or support the establishment of the LSP to enable the packet to traverse the LSP. For example, label module 108 may, as part of network node 202 in FIG. 5 or 7, assign a label to a specific link that leads to another network node. By doing so, label module 108 may enable any packet whose label stack includes that assigned label to be forwarded to that other network node by way of the specific link. In other words, any packet that arrives at network node 202 and includes the assigned label as the next one to be popped (e.g., the top label in the label stack) may be forwarded to the other network node by way of the specific link unless that other network node has failed. Label module 108 may store the label in connection with the specific link and/or the corresponding network node in the routing table of the control plane. Additionally or alternatively, label module 108 may store the label in connection with the specific link and/or the corresponding network node in the forwarding table of the data plane.

Figure 5:
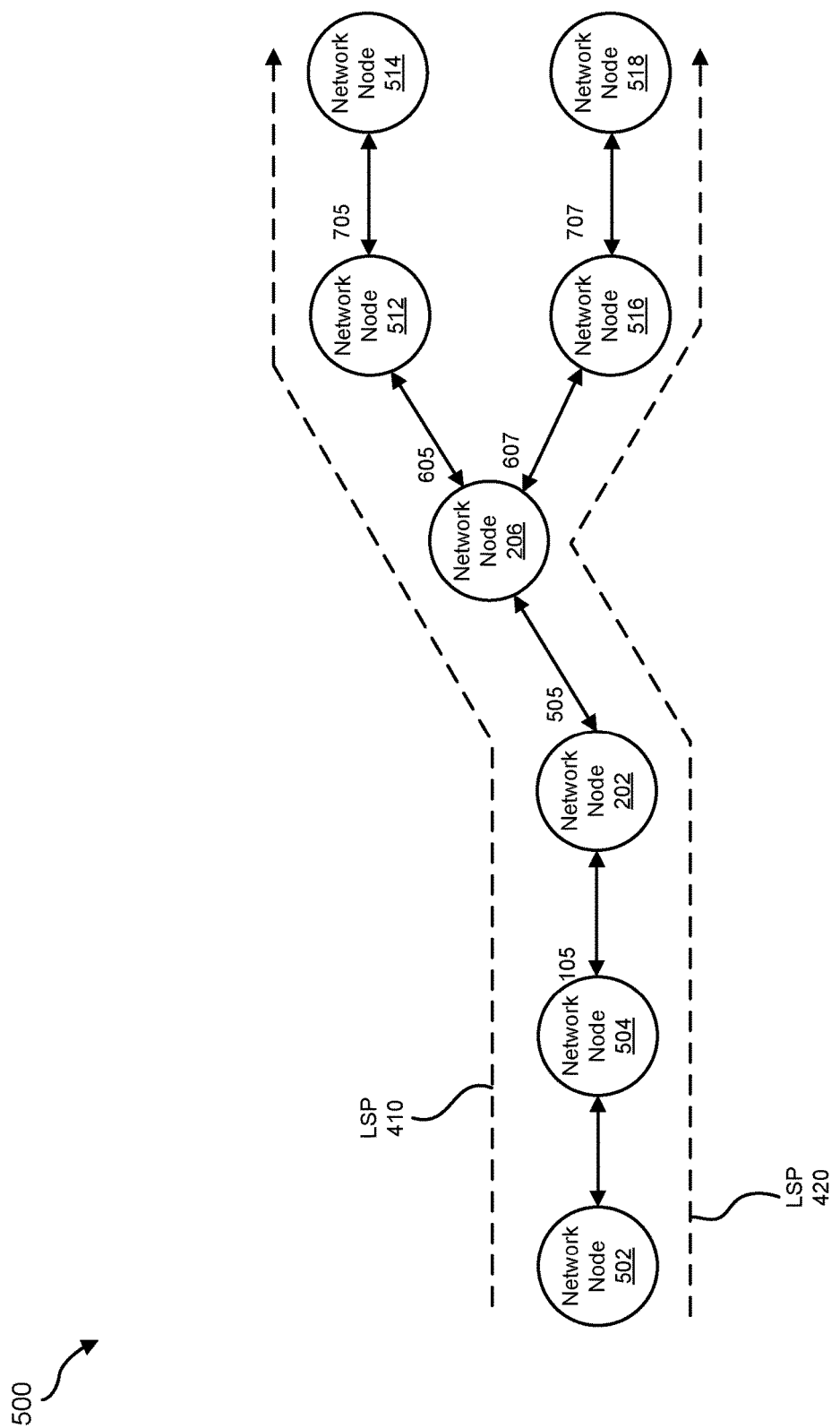
FIG. 5 is a block diagram of an additional exemplary system for providing node protection across LSPs that share labels.
Figure 7:
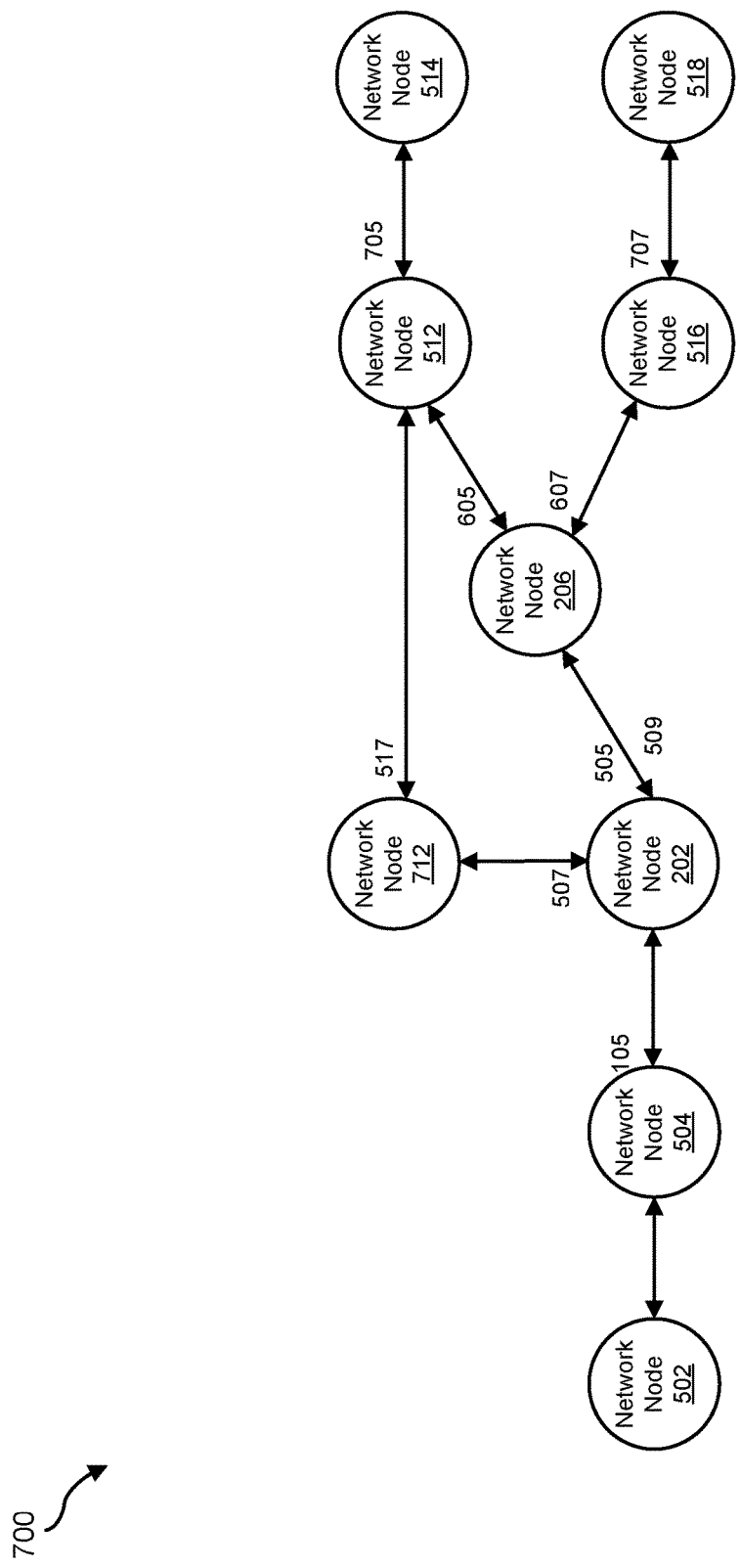
FIG. 7 is a block diagram of an additional exemplary system for providing node protection across LSPs that share labels.

Continuing with this example, receiving module 104 may, as part of network node 202 in FIG. 5 or 7, receive a reservation message that is to include labels assigned to links that lead to network nodes included in the LSP. In this example, the reservation message may include and/or represent an RSVP-TE message that originated from an egress node of the LSP and is destined for the ingress node of the LSP. The term "egress node," as used herein, generally refers to any physical computing device that represents the final hop and/or final destination node of the LSP. The term "ingress node," as used herein, generally refers to any physical computing device that represents the node at which the LSP begins and/or originates.

In one example, label module 108 may assign a label to network node 206 or the link leading to network node 206 from network node 202. As the reservation message arrives at network node 202, label module 108 may add that label to the reservation message. Once the label is added to the reservation message, forwarding module 110 may, as part of network node 202 in FIG. 5 or 7, forward the reservation message toward the ingress node that created and/or manages the LSP.

As a specific example in connection with FIG. 5, network node 502 in FIG. 5 may create and/or establish an LSP that includes network nodes 502, 206, 202, 510, and 512. To do so, network node 502 may create an RSVP-TE path message and then forward the same to network node 504 in FIG. 5 on the way to network node 514 in FIG. 5. In this example, the path message may eventually store the path state of each node included in the LSP. Upon receiving the path message, network node 504 may add its IP address to the path message and then forward the same to network node 202 in FIG. 5.

Continuing with this example, network node 202 may add its IP address to the path message and then forward the same to network node 206 in FIG. 5. Upon receiving the path message, network node 206 may add its IP address to the path message and then forward the same to network node 512 in FIG. 5. Network node 512 may then add its IP address to the path message and then forward the same to network node 514 in FIG. 5. To enable network node 502 to finish creating and/or establishing the LSP, network node 514 may create an RSVP-TE reservation message and then forward the same to network node 512 on the way back to network node 502. In one example, this reservation message may include one or more IP addresses of the network nodes in the LSP.

In this example, network node 512 may assign label 705 to the link that leads to network node 512. Upon receiving the reservation message, network node 512 may add label 705 to the reservation message. In some examples, network node 512 may also add its IP address to the reservation message. For example, network node 512 may add label 705 to the label object in the reservation message. In this example, network node 512 may also add label 705 to the label sub-object in the record-route object of the reservation message. Additionally or alternatively, the label sub-object in the record-route object may include a new flag bit that denotes and/or indicates that label 705 is a pop-and-forward label, as opposed to a swap-and-forward label, such that the ingress node is able to determine the correct label type of each hop in the LSP. Network node 512 may then forward the reservation message to network node 206.

In this example, network node 206 may assign label 605 to the link that leads to network node 512. Upon receiving the reservation message, network node 206 may add label 605 to the reservation message. In some examples, network node 206 may also add its IP address to the reservation message. Network node 206 may then forward the reservation message to network node 202.

In this example, network node 202 may assign label 505 to the link that leads to network node 206. Upon receiving the reservation message, network node 202 may add label 505 to the reservation message. In some examples, network node 202 may also add its IP address to the reservation message. Network node 202 may then forward the reservation message to network node 504.

In this example, network node 504 may assign label 105 to the link that leads to network node 202. Upon receiving the reservation message, network node 202 may add label 105 to the reservation message. In some examples, network node 504 may also add its IP address to the reservation message. Network node 504 may then forward the reservation message to network node 502.

Figure 4:
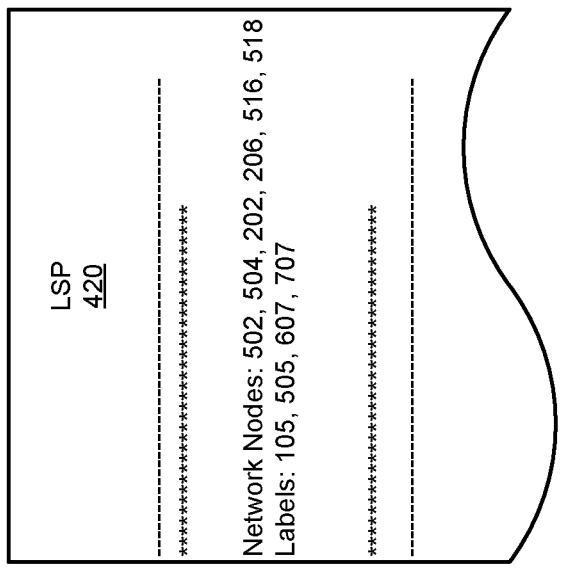
FIG. 4 is an illustration of information that identifies LSPs.
Figure 4:
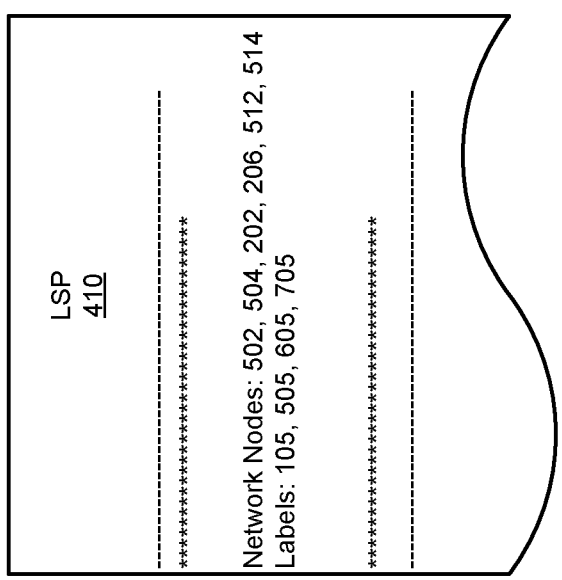

Upon receiving the reservation message, network node 502 may compute the LSP identified in the reservation message and then establish the LSP by recording all of the labels included in the reservation message. For example, network node 502 may parse the record-route object in the reservation message to create LSP 410 in FIG. 4 based at least in part on labels 105, 505, 605, and 705. However, in the event that all nodes included in the LSP support pop-and-forward labels, network node 502 may simply stack the labels recorded in the record-route object of the reservation message. As illustrated in FIG. 4, LSP 410 may include and/or represent network nodes 502, 504, 202, 206, 512, and 514 and labels 105, 505, 605, and 705 that lead from node 504 to node 202, from node 202 to node 206, from node 206 to node 512, and from node 512 to node 514, respectively.

Now that LSP 410 has been established, network node 502 may forward packets along LSP 410 to network node 514 by inserting a label stack consisting of labels 105, 505, 605, and 705 in the packets' headers. In addition, network node 502 may manage and/or modify LSP 410 at a later point in time.

Since, in this example, label 505 may correspond to network node 206 and/or the link leading from network node 202 to network node 206, any packet whose label stack includes label 505 may be forwarded from network node 202 to network node 206 unless network node 206 has failed. In the event that network node 206 has failed, network node 202 may identify the packet's backup path and then forward the packet along the same. The packet may eventually reunite with the primary path and/or original LSP at a merge point (e.g., at network node 512), where the primary path and the backup path merge with one another.

In some examples, network node 502 in FIG. 5 may create and/or establish an LSP 420 that includes network nodes 502, 504, 202, 206, 516, and 518 in the same way as LSP 410. As illustrated in FIG. 4, LSP 420 may include and/or represent network nodes 502, 504, 202, 206, 516, and 518 and labels 105, 505, 607, and 707 that lead from node 504 to node 202, from node 202 to node 206, from node 206 to node 516, and from node 516 to node 518, respectively.

As demonstrated by LSPs 410 and 420, the various apparatuses and/or systems described herein may share labels across LSPs. For example, LSPs 410 and 420 may each include and/or utilize labels 105 and 505. Accordingly, label module 108 may enable different LSPs to use the same label for a specific link instead of assigning distinct labels to the same link across the different LSPs, thereby drastically reducing resource consumption and/or processing demands. As a result, each network node may be able to manage the labels in the forwarding table of the data plane without needing to perform updates so frequently when compared to traditional label-management configurations.

In this example, network node 502 may represent the ingress of LSP 410, and network node 514 may represent the egress of LSP 410. Upon establishing LSP 410, network node 502 may identify a packet that is at least intermediately destined for network node 514. In one example, the packet may have a final destination of a client device (not illustrated in FIG. 5) that is reachable via network node 514. Alternatively, the packet may have a final destination of network node 514 itself.

In one example, network node 502 may determine that LSP 410 leads to network node 514. In response to that determination, network node 502 may formulate and/or generate a label stack consisting of labels 105, 505, 605, and 705 for the packet. Network node 502 may add this label stack to the packet to facilitate traversing from network node 502 to network node 514 via LSP 410. Network node 502 may then forward the packet to network node 504 on the way to network node 514 via LSP 410. Upon receiving the packet, network node 504 may pop label 105 from the packet's label stack and then forward the packet to network node 202.

Returning to FIG. 3, at step 330 one or more of the apparatuses and/or systems described herein may pop, from the label stack, a label that corresponds to a next hop of the network node included in the LSP. For example, label module 108 may, as part of network node 202 in FIG. 5 or 7, pop a label from the label stack included in the packet's header. In this example, the popped label may correspond to network node 206, which is the next hop of network node 202 in exemplary system 500 in FIG. 5 and exemplary system 700 in FIG. 7. More specifically, the popped label may correspond to the link and/or interface that leads from network device 202 to network node 206 in FIG. 5 or 7.

The systems described herein may perform step 330 in a variety of different ways and/or contexts. In some examples, label module 108 may identify the next label (e.g., the top label) to be popped from the label stack included in the packet's header. Upon identifying that label, label module 108 may pop that label from the label stack. For example, label module 108 may delete and/or remove label 505 from the label stack. In this example, label 505 may identify the link leading to network node 206 as the next portion of the LSP to be traversed by the packet. In this example, label 505 may be shared by all the LSPs that include the link from the network node 202 to network node 206. The label stack may still include label 605, which directs the packet to network node 512. The label stack may also still include label 705, which directs the packet to the LSP's egress at network node 514.

Returning to FIG. 3, at step 340 one or more of the apparatuses and/or systems described herein may determine, based at least in part on the label, that the next hop has experienced a failure that prevents the packet from reaching a destination via the next hop. For example, determination module 110 may, as part of network node 202 in FIG. 5 or 7, determine that network node 206 has experienced a failure that prevents the packet from reaching its destination via network node 206. In this example, determination module 110 may make and/or arrive at this determination based at least in part on the label, within the label stack, that identifies and/or corresponds to network node 206 as the packet's next hop.

In one example, the failure may have occurred on the network node 206 itself. Alternatively, the failure may have occurred on the link and/or interface that leads from network node 202 to network node 206.

The systems described herein may perform step 340 in a variety of different ways and/or contexts. In some examples, determination module 110 may determine that the packet's next hop has experienced a failure due at least in part to a lack of connectivity between network node 202 and the next hop. For example, network node 202 may unsuccessfully attempt to communicate with network node 206. As a result of this unsuccessful attempt, determination module 110 may determine that either the link leading to network node 206 or network node 206 itself has failed.

In some examples, determination module 110 may determine that the packet's next hop has experienced a failure based at least in part on a message received from another node. For example, network node 202 may receive a message from network node 512, network node 516, or another node (not necessarily illustrated in FIG. 5). In this example, the message may indicate that network node 206 has failed or is unreachable via the link leading from network node 202. As a result of this message, determination module 110 may determine that the network node 206 has failed or is unreachable via the link leading from network node 202 to network node 206.

Returning to FIG. 3, at step 350 one or more of the apparatuses and/or systems described herein may identify a backup path that (1) merges with the LSP at a next-to-next hop included in the LSP and (2) enables the packet to bypass the failed next hop and reach the destination. For example, identification module 106 may, as part of network node 202 in FIG. 5 or 7, identify a backup path for the packet. In this example, the backup path for the packet may merge with the LSP at network node 512, which is the next-to-next hop of network node 202. In addition, the backup path for the packet may enable the packet to bypass failed network node 206 and reach the packet's destination despite the failure.

The systems described herein may perform step 350 in a variety of different ways and/or contexts. In some examples, identification module 106 may identify the backup path based at least in part on a context table. For example, after the reservation message has arrived at network node 202, table module 114 may, as part of network node 202, create a context table in connection with the next hop. Table module 114 may then record all of the labels assigned to the network nodes included in that LSP within the context table.

In one example, network node 202 may create and/or maintain a different context table for each next hop and/or neighboring node. The context table may include and/or represent a form of routing or forwarding table. Each context table may include one or more of the labels that correspond to the downstream links and/or nodes in an LSP. For example, the context table for a particular next hop may include the label provided by that next hop in the RRO of the reservation message for that LSP. In this example, that label may be the one expected by the next-to-next hop in that LSP.

After the packet has arrived at network node 202, identification module 106 may search the context table for a bypass label assigned to the next hop in the backup path of the packet. For example, after the top label has been popped from the label stack, identification module 106 may search the context table corresponding to failed network node 206 using the next label in the label stack. During this search, identification module 106 may locate at least one label that identifies at least one downstream link and/or node that leads back to the merge point for the LSP and the backup path. In this example, label module 108 may pop the next label (which was used to perform the search) from the label stack and then apply the label for the backup path to the packet.

In one example, the backup path may include and/or represent a single network node (not illustrated in FIG. 5) between network node 202 and the merge point (e.g., network node 512 in FIG. 5). In another example, the backup path may include and/or represent multiple network nodes (not illustrated in FIG. 5) between network node 202 and the merge point (e.g., network node 512 in FIG. 5).

In one example, the node(s) along the backup path may forward the packet toward the merge point. At the merge point, the LSP may once again continue using the labels in the label stack to ultimately reach the egress node.

In some examples, the nodes included in the backup path may implement and/or use swap-and-forward labels to forward traffic to the merge point. Alternatively, the nodes included in the backup path may implement and/or use pop-and-forward labels to forward traffic to the merge point. In such examples, identification module 106 may locate a separate label stack during the search of the context table. This separate label stack may include multiple labels corresponding to the backup path. Network node 202 may represent the ingress node of a separate LSP from the one whose traffic is being diverted from the failed network node 206.

In an alternative example, the backup path may include and/or represent a single direct link between network node 202 and the merge point without any intermediary nodes. In other words, the backup path may include no actual nodes. In this example, network node 202 may be able to forward the packet directly to the merge point on the way to the egress node.

In some examples, network node 202 may protect against a next hop failing by allocating and/or assigning separate non-shared labels for each next-to-next hop. Some of the nodes within the primary path and/or original LSP may still use shared labels, and/or network node 202 may still store and/or use shared labels for other LSPs. In this example, network node 202 may allocate and/or assign a different label per next-to-next hop instead of per next hop.

In such examples, identification module 106 may track the next hop identifier and the next-to-next hop identifier of the primary path and/or original LSP based on the RRO in the reservation message. In one example, the merge point may include and/or represent the next-to-next hop (e.g., network node 512 in FIG. 5) from the perspective of network node 202. In this example, label module 108 may allocate a separate label for a tuple that includes the next hop identifier and the next-to-next hop identifier. LSPs that have the same next hop and next-to-next hop from the perspective of network node 202 may use and/or share the same forwarding label and backup path.

Figure 6:
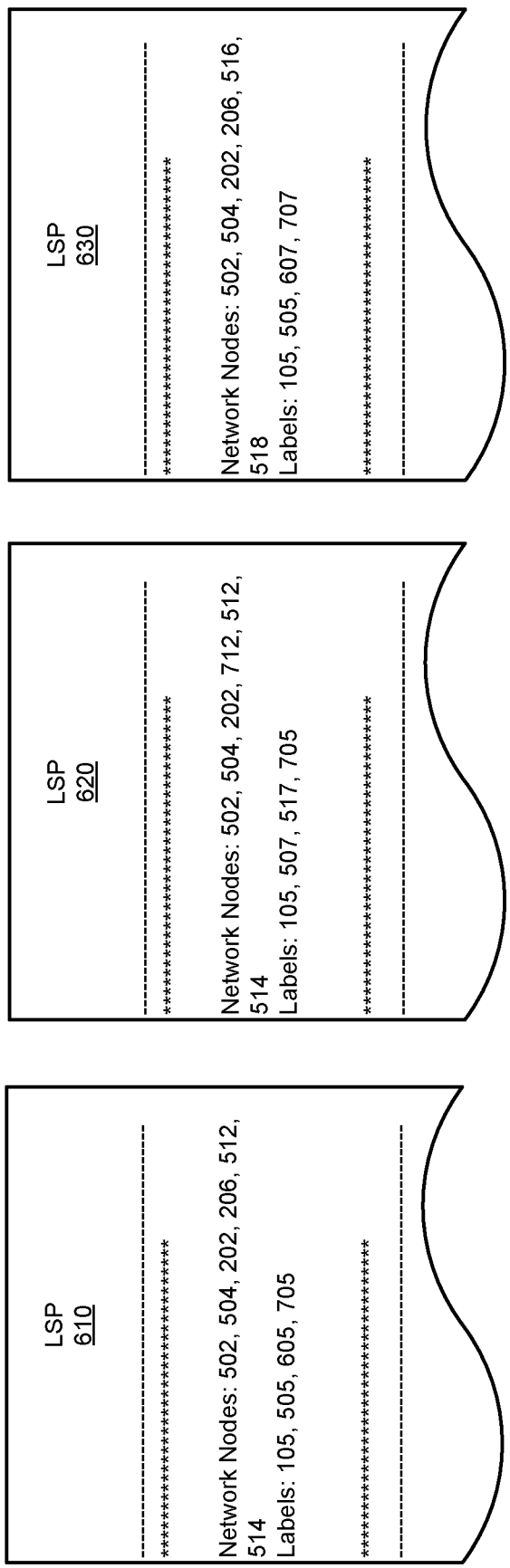
FIG. 6 is an illustration of additional information that identifies additional LSPs.

As an example, during the establishment of an LSP 610 in FIG. 6, network node 202 may receive a reservation message on its way to the ingress node. As illustrated in FIG. 6, LSP 610 may include and/or represent network nodes 502, 504, 202, 206, 512, and 514 and labels 105, 505, 605, and 705 that lead from node 504 to node 202, from node 202 to node 206, from node 206 to node 512, and from node 512 to node 514, respectively.

Upon receiving the reservation message, network node 202 may identify labels 705 and 605 included in the RRO of the reservation message. Label module 108 may then allocate and/or assign label 505 to identify and/or represent the portion of the primary path that includes network node 206 and network node 512 based at least in part on labels 705 and 605 included in the RRO. In this example, label 505 allocated and/or assigned by network node 202 may be shared by all LSPs that include the link from network node 202 to network node 206 and the link from network node 206 to network node 512.

In addition, label module 108 may create and/or assign at least one bypass label to the backup path of LSP 610 and/or at least one network node included in the backup path of LSP 610. In this example, label module 108 may associate this bypass label with labels 505 and 605 to enable any packets that include labels 505 and 605 to bypass network node 206 via that backup path and reach network node 514 even though network node 206 has failed.

In the event that network node 206 is functional and reachable, network node 202 may simply pop the top label from the label stack of a packet and then forward that packet to network node 206 in the primary path. However, in the event that network node 206 has failed or is unreachable, network node 202 may pop the top label and subsequent label from the packet's label stack. In this example, the subsequent label may correspond to network node 512 and/or reside just under and/or subsequent to the top label in the packet's label stack. Network node 202 may look up and/or find at least one bypass label corresponding to the backup path based on the popped top and subsequent labels. Network node 202 may then apply that newly found bypass label to the packet.

As an additional example, during the establishment of an LSP 620 in FIG. 6, network node 202 may receive an additional reservation message on its way to the ingress node. As illustrated in FIG. 6, LSP 620 may include and/or represent network nodes 502, 504, 202, 712, 512, and 514 and labels 105, 507, 517, and 705 that lead from node 504 to node 202, from node 202 to node 712, from node 712 to node 512, and from node 512 to node 514, respectively.

Upon receiving the additional reservation message, network node 202 may identify labels 705 and 517 included in the RRO of the reservation message. Label module 108 may then allocate and/or assign label 507 to identify and/or represent the portion of the primary path that includes network node 712 and network node 512 based at least in part on labels 705 and 517 included in the RRO. In this example, label 507 allocated and/or assigned by network node 202 may be shared by all LSPs that include the link from network node 202 to network node 712 and the link from network node 712 to network node 512.

In addition, label module 108 may create and/or assign at least one bypass label to the backup path of LSP 620 and/or at least one network node included in the backup path of LSP 620. In this example, label module 108 may associate this bypass label with labels 507 and 517 to enable any packets that include labels 507 and 517 to bypass network node 712 via that backup path and reach network node 514 even though network node 712 has failed.

In the event that network node 712 is functional and reachable, network node 202 may simply pop the top label from the label stack of a packet and then forward that packet to network node 712 in the primary path. However, in the event that network node 712 has failed or is unreachable, network node 202 may pop the top label and subsequent label from the packet's label stack. In this example, the subsequent label may correspond to network node 512 and/or reside just under and/or subsequent to the top label in the packet's label stack. Network node 202 may look up and/or find at least one bypass label corresponding to the backup path based on the popped top and subsequent labels. Network node 202 may then apply that newly found bypass label to the packet.

As a further example, during the establishment of an LSP 630 in FIG. 6, network node 202 may receive a further reservation message on its way to the ingress node. As illustrated in FIG. 6, LSP 630 may include and/or represent network nodes 502, 504, 202, 206, 516, and 518 and labels 105, 509, 607, and 707 that lead from node 504 to node 202, from node 202 to node 206, from node 206 to node 516, and from node 516 to node 518, respectively.

Upon receiving the reservation message, network node 202 may identify labels 607 and 707 included in the RRO of the reservation message. Label module 108 may then allocate and/or assign label 509 to identify and/or represent the portion of the primary path that includes network node 206 and network node 516 based at least in part on labels 705 and 607 included in the RRO. In this example, label 509 allocated and/or assigned by network node 202 may be shared by all LSPs that include the link from network node 202 to network node 206 and the link from network node 516 to network node 518.

In addition, label module 108 may create and/or assign at least one bypass label to the backup path of LSP 630 and/or at least one network node included in the backup path of LSP 630. In this example, label module 108 may associate this bypass label with labels 509 and 607 to enable any packets that include labels 509 and 607 to bypass network node 206 via that backup path and reach network node 518 even though network node 206 has failed.

In the event that network node 206 is functional and reachable, network node 202 may simply pop the top label from the label stack of a packet and then forward that packet to network node 206 in the primary path. However, in the event that network node 206 has failed or is unreachable, network node 202 may pop the top label and subsequent label from the packet's label stack. In this example, the subsequent label may correspond to network node 516 and/or reside just under and/or subsequent to the top label in the packet's label stack. Network node 202 may look up and/or find at least one bypass label corresponding to the backup path based on the popped top and subsequent labels. Network node 202 may then apply that newly found bypass label to the packet.

In these examples, labels 505, 507, and 509 may differ from one another and/or not be shared by LSPs 610, 620, and 630. Network node 202 may have and/or identify a different backup path for each of LSPs 610, 620, and 630. For example, network node 202 may be configured and/or programmed to use a first backup path for the LSP 610 in the event that the network node 206 fails. In this example, network node 202 may also be configured and/or programmed to use a second backup path for LSP 620 in the event that network node 712 fails. Since, in this example, both of LSPs 610 and 620 have the same merge point in the event that network node 206 fails, the first and second backup paths may or may not be one and the same. In addition, network node 202 may be further configured and/or programmed to use a third backup path for LSP 630 in the event that network node 206 fails.

Returning to FIG. 3, at step 360 one or more of the apparatuses and/or systems described herein may forward the packet to the next-to-next hop via the backup path. For example, forwarding module 112 may, as part of network node 202 in FIG. 5 or 7, forward the packet to the next-to-next hop of network node 202 via the backup path. In this example, the backup path may include and/or represent any number of nodes (including, e.g., 0, 1, 2, or 3 nodes, etc.)

The systems described herein may perform step 360 in a variety of different ways and/or contexts. In one example, forwarding module 112 may direct network node 202 to send the packet along the backup path. For example, in the event that network node 712 in FIG. 7 represents the packet's backup path, forwarding module 112 may direct network node 202 to send the packet to network node 712. In this example, the packet's header may identify and/or include label 517 as the bypass label. Upon receiving the packet, network node 712 may pop label 517 and then forward the packet to network node 512.

Continuing with this example, network node 512 may receive the packet from network node 712. Network node 512 may identify label 705 within the original label stack of the packet. In this example, label 705 may correspond to network node 514, which represents the next-to-next-to-next hop of network node 202. Network node 512 may then pop label 705 from the original label stack of the packet. Upon popping label 705, network node 512 may forward the packet to network node 514, which represents the packet's egress node.

Figure 8:
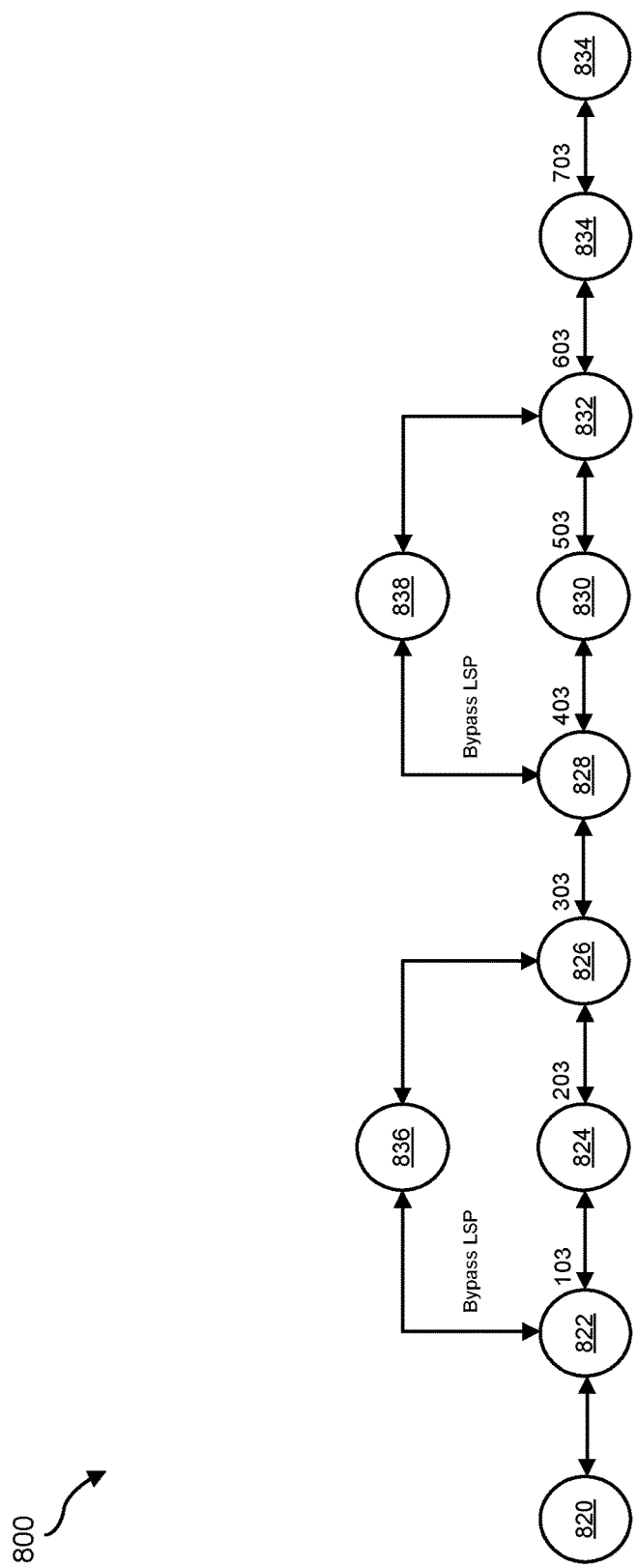
FIG. 8 is a block diagram of an additional exemplary system for providing node protection across LSPs that share labels.

In some examples, LSPs may include a combination of pop-and-forward nodes and swap-and-forward nodes. FIG. 8 illustrates an exemplary system 800 that includes various nodes that form certain paths within a network. As illustrated in FIG. 8, system 800 may include and/or represent network nodes 820, 822, 824, 826, 828, 830, 832, 834, 836, 838, and/or 840. In this example, the primary path from network node 820 to network node 836 may include and/or represent network nodes 822, 824, 826, 828, 830, 832, and 834. Network nodes 836 and 838 may represent bypass LSPs that facilitate bypassing network nodes 824 and 830, respectively, in the event of a failure.

As illustrated in FIG. 8, the corresponding labels that facilitate passage by way of the primary path include and/or represent labels 103, 203, 303, 403, 503, 603, and 703. In one example, some of these labels may represent pop-and-forward labels, and others may represent swap-and-forward labels. For example, labels 103, 603, and 703 may represent pop-and-forward labels capable of being incorporated into a packet's label stack. In this example, label 203, 303, 403, and 503 may represent traditional swap-and-forward labels that are incapable of being incorporated into a packet's label stack.

Figure 9:
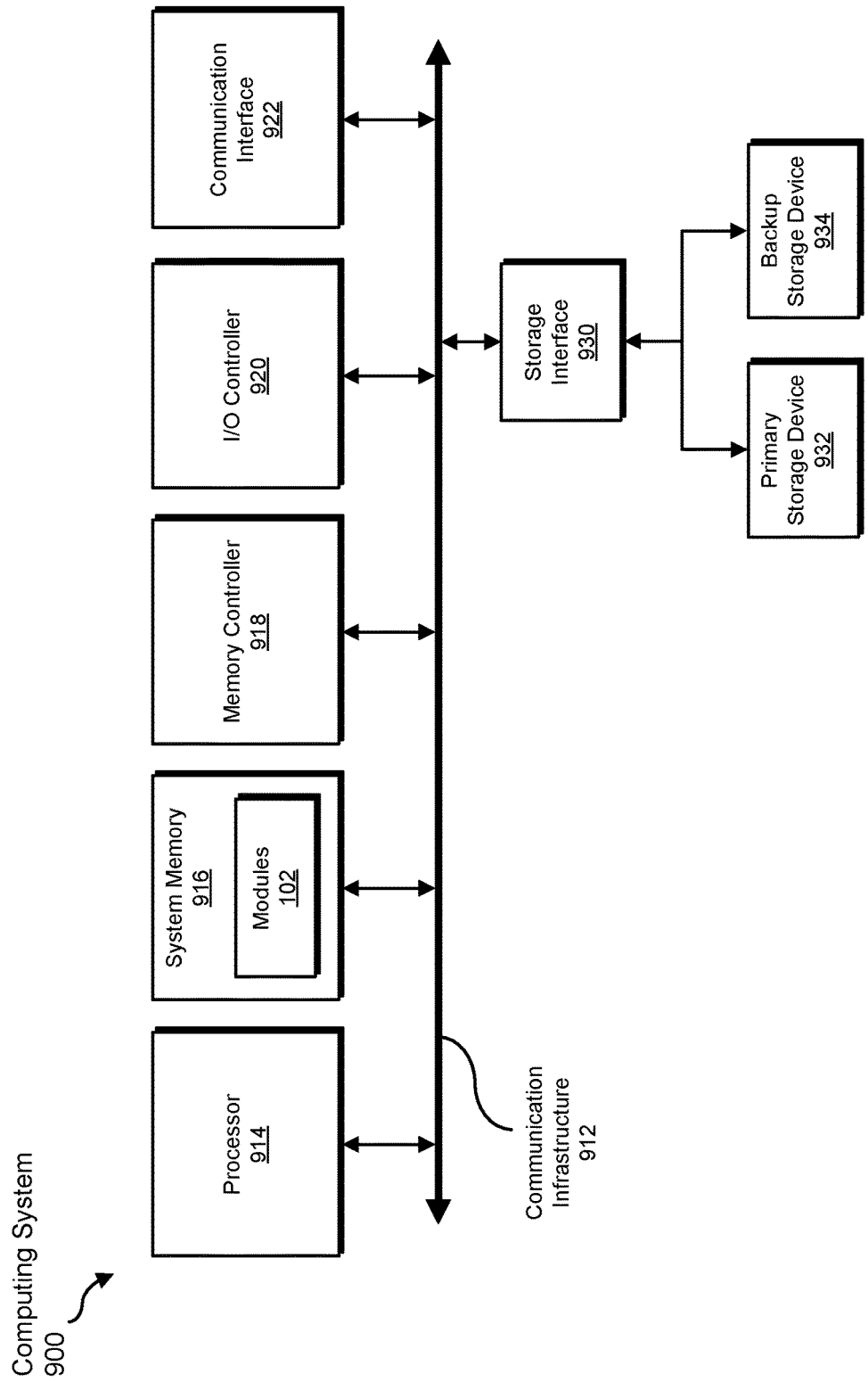
FIG. 9 is a block diagram of an exemplary computing system capable of implementing and/or being used in connection with one or more of the embodiments described and/or illustrated herein.

FIG. 9 is a block diagram of an exemplary computing system 900 capable of implementing and/or being used in connection with one or more of the embodiments described and/or illustrated herein. In some embodiments, all or a portion of computing system 900 may perform and/or be a means for performing, either alone or in combination with other elements, one or more of the steps described in connection with FIG. 3. All or a portion of computing system 900 may also perform and/or be a means for performing and/or implementing any other steps, methods, or processes described and/or illustrated herein. In one example, computing system 900 may include and/or store all or a portion of modules 102 from FIG. 1.

Computing system 900 broadly represents any type or form of electrical load, including a single or multi-processor computing device or system capable of executing computer-readable instructions. Examples of computing system 900 include, without limitation, workstations, laptops, client-side terminals, servers, distributed computing systems, mobile devices, network switches, network routers (e.g., backbone routers, edge routers, core routers, mobile service routers, broadband routers, etc.), network appliances (e.g., network security appliances, network control appliances, network timing appliances, SSL VPN (Secure Sockets Layer Virtual Private Network) appliances, etc.), network controllers, gateways (e.g., service gateways, mobile packet gateways, multi-access gateways, security gateways, etc.), and/or any other type or form of computing system or device.

Computing system 900 may be programmed, configured, and/or otherwise designed to comply with one or more networking protocols. According to certain embodiments, computing system 900 may be designed to work with protocols of one or more layers of the Open Systems Interconnection (OSI) reference model, such as a physical layer protocol, a link layer protocol, a network layer protocol, a transport layer protocol, a session layer protocol, a presentation layer protocol, and/or an application layer protocol. For example, computing system 900 may include a network device configured according to a Universal Serial Bus (USB) protocol, an Institute of Electrical and Electronics Engineers (IEEE) 1394 protocol, an Ethernet protocol, a T1 protocol, a Synchronous Optical Networking (SONET) protocol, a Synchronous Digital Hierarchy (SDH) protocol, an Integrated Services Digital Network (ISDN) protocol, an Asynchronous Transfer Mode (ATM) protocol, a Point-to-Point Protocol (PPP), a Point-to-Point Protocol over Ethernet (PPPoE), a Point-to-Point Protocol over ATM (PPPoA), a Bluetooth protocol, an IEEE 802.XX protocol, a frame relay protocol, a token ring protocol, a spanning tree protocol, and/or any other suitable protocol.

Computing system 900 may include various network and/or computing components. For example, computing system 900 may include at least one processor 914 and a system memory 916. Processor 914 generally represents any type or form of processing unit capable of processing data or interpreting and executing instructions. For example, processor 914 may represent an application-specific integrated circuit (ASIC), a system on a chip (e.g., a network processor), a hardware accelerator, a general purpose processor, and/or any other suitable processing element.

Processor 914 may process data according to one or more of the networking protocols discussed above. For example, processor 914 may execute or implement a portion of a protocol stack, may process packets, may perform memory operations (e.g., queuing packets for later processing), may execute end-user applications, and/or may perform any other processing tasks.

System memory 916 generally represents any type or form of volatile or non-volatile storage device or medium capable of storing data and/or other computer-readable instructions. Examples of system memory 916 include, without limitation, Random Access Memory (RAM), Read Only Memory (ROM), flash memory, or any other suitable memory device. Although not required, in certain embodiments computing system 900 may include both a volatile memory unit (such as, for example, system memory 916) and a non-volatile storage device (such as, for example, primary storage device 932, as described in detail below). System memory 916 may be implemented as shared memory and/or distributed memory in a network device. Furthermore, system memory 916 may store packets and/or other information used in networking operations.

In certain embodiments, exemplary computing system 900 may also include one or more components or elements in addition to processor 914 and system memory 916. For example, as illustrated in FIG. 9, computing system 900 may include a memory controller 918, an Input/Output (I/O) controller 920, and a communication interface 922, each of which may be interconnected via communication infrastructure 912. Communication infrastructure 912 generally represents any type or form of infrastructure capable of facilitating communication between one or more components of a computing device. Examples of communication infrastructure 912 include, without limitation, a communication bus (such as a Serial ATA (SATA), an Industry Standard Architecture (ISA), a Peripheral Component Interconnect (PCI), a PCI Express (PCIe), and/or any other suitable bus), and a network.

Memory controller 918 generally represents any type or form of device capable of handling memory or data or controlling communication between one or more components of computing system 900. For example, in certain embodiments memory controller 918 may control communication between processor 914, system memory 916, and I/O controller 920 via communication infrastructure 912. In some embodiments, memory controller 918 may include a Direct Memory Access (DMA) unit that may transfer data (e.g., packets) to or from a link adapter.

I/O controller 920 generally represents any type or form of device or module capable of coordinating and/or controlling the input and output functions of a computing device. For example, in certain embodiments I/O controller 920 may control or facilitate transfer of data between one or more elements of computing system 900, such as processor 914, system memory 916, communication interface 922, and storage interface 930.

Communication interface 922 broadly represents any type or form of communication device or adapter capable of facilitating communication between exemplary computing system 900 and one or more additional devices. For example, in certain embodiments communication interface 922 may facilitate communication between computing system 900 and a private or public network including additional computing systems. Examples of communication interface 922 include, without limitation, a link adapter, a wired network interface (such as a network interface card), a wireless network interface (such as a wireless network interface card), and any other suitable interface. In at least one embodiment, communication interface 922 may provide a direct connection to a remote server via a direct link to a network, such as the Internet. Communication interface 922 may also indirectly provide such a connection through, for example, a local area network (such as an Ethernet network), a personal area network, a wide area network, a private network (e.g., a virtual private network), a telephone or cable network, a cellular telephone connection, a satellite data connection, or any other suitable connection.

In certain embodiments, communication interface 922 may also represent a host adapter configured to facilitate communication between computing system 900 and one or more additional network or storage devices via an external bus or communications channel. Examples of host adapters include, without limitation, Small Computer System Interface (SCSI) host adapters, Universal Serial Bus (USB) host adapters, IEEE 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 922 may also enable computing system 900 to engage in distributed or remote computing. For example, communication interface 922 may receive instructions from a remote device or send instructions to a remote device for execution.

As illustrated in FIG. 9, exemplary computing system 900 may also include a primary storage device 932 and/or a backup storage device 934 coupled to communication infrastructure 912 via a storage interface 930. Storage devices 932 and 934 generally represent any type or form of storage device or medium capable of storing data and/or other computer-readable instructions. For example, storage devices 932 and 934 may represent a magnetic disk drive (e.g., a so-called hard drive), a solid state drive, a floppy disk drive, a magnetic tape drive, an optical disk drive, a flash drive, or the like. Storage interface 930 generally represents any type or form of interface or device for transferring data between storage devices 932 and 934 and other components of computing system 900.

In certain embodiments, storage devices 932 and 934 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 932 and 934 may also include other similar structures or devices for allowing computer software, data, or other computer-readable instructions to be loaded into computing system 900. For example, storage devices 932 and 934 may be configured to read and write software, data, or other computer-readable information. Storage devices 932 and 934 may be a part of computing system 900 or may be separate devices accessed through other interface systems.

Many other devices or subsystems may be connected to computing system 900. Conversely, all of the components and devices illustrated in FIG. 9 need not be present to practice the embodiments described and/or illustrated herein. The devices and subsystems referenced above may also be interconnected in different ways from those shown in FIG. 9. Computing system 900 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives and floppy disks), optical-storage media (e.g., Compact Disks (CDs) and Digital Video Disks (DVDs)), electronic-storage media (e.g., solid-state drives and flash media), and other distribution systems.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of system 100 in FIG. 1 may represent portions of a cloud-computing or network-based environment. Cloud-computing and network-based environments may provide various services and applications via the Internet. These cloud-computing and network-based services (e.g., software as a service, platform as a service, infrastructure as a service, etc.) may be accessible through a web browser or other remote interface. Various functions described herein may also provide network switching capabilities, gateway access capabilities, network security functions, content caching and delivery services for a network, network control services, and/or and other networking functionality.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A method comprising:
   receiving, at a network node within a network, a packet from another network node within the network;
   identifying, within the packet, a label stack that includes a plurality of labels that collectively represent at least a portion of a label-switched path within the network;
   popping, from the label stack, a label that corresponds to a next hop of the network node included in the label-switched path;
   determining, based at least in part on the label, that the next hop has experienced a failure that prevents the packet from reaching a destination via the next hop;
   in response to determining that the next hop has experienced the failure, identifying a backup path that:
      merges with the label-switched path at a next-to-next hop included in the label-switched path; and
      enables the packet to bypass the failed next hop and reach the destination;
   upon identifying the backup path, forwarding the packet toward the next-to-next hop via the backup path;
   receiving, at the next-to-next hop, the packet from a bypass network node included in the backup path;
   identifying, within the label stack of the packet, a further label that corresponds to a next-to-next-to-next hop included in the label-switched path;
   popping the further label from the label stack of the packet; and
   upon popping the further label from the label stack, forwarding the packet to the next-to-next-to-next hop toward the destination.

2. The method of claim 1, further comprising assigning, by the network node, the label to the next hop such that any packet whose label stack includes the label assigned to the next hop is forwarded to the next hop unless the next hop has failed.

3. The method of claim 2, further comprising:
   receiving, at the network node, a reservation message that includes labels assigned to network nodes included in the label-switched path;
   creating, at the network node, a context table in connection with the next hop; and
   recording, within the context table, the labels assigned to the network nodes included in the label-switched path.

4. The method of claim 3, wherein identifying the backup path comprises searching the context table for at least one bypass label assigned to at least one bypass network node included in the backup path by:
   identifying, within the label stack, a subsequent label that:
      resides subsequent to the label popped from the label stack; and
      corresponds to the next-to-next hop included in the label-switched path; and
   locating, within the context table, the bypass label assigned to the bypass network node included in the backup path based at least in part on the subsequent label; and
   further comprising applying the bypass label to the packet at the network node prior to forwarding the packet via the backup path.

5. The method of claim 4, further comprising popping, from the label stack, the subsequent label that corresponds to the next-to-next hop included in the label-switched path prior to forwarding the packet via the backup path.

6. The method of claim 1, wherein assigning the label to the next hop comprises enabling a plurality of label-switched paths to use the same label assigned to the next hop instead of assigning another label to the next hop for another label-switched path that includes the next hop.

7. The method of claim 6, wherein enabling the plurality of label-switched paths to use the same label comprises sharing the same label across the plurality of label-switched paths.

8. The method of claim 1, wherein determining that the next hop has experienced the failure comprises determining that a link between the network node and the next hop has failed.

9. The method of claim 1, wherein identifying the backup path comprises:
- identifying, within the label stack, a subsequent label that:
  - resides subsequent to the label popped from the label stack; and
  - corresponds to the next-to-next hop included in the label-switched path;
- looking up a bypass label assigned to at least one bypass network node included in the backup path based at least in part on the subsequent label; and
- further comprising applying the bypass label to the packet at the network node prior to forwarding the packet via the backup path.

10. The method of claim 9, further comprising:
- assigning, by the network node, the subsequent label to the next-to-next hop; and
- associating, by the network node, the bypass label with the label and the subsequent label such that the network node is able to identify, based at least in part on the label and the subsequent label, the backup path as enabling the packet to bypass the failed next hop and reach the destination.

11. The method of claim 1, wherein the plurality of labels included in the label stack comprise:
- at least one label that is shared across a plurality of label-switched paths; and
- at least one label that is unique to the label-switched path.

12. A system comprising:
- a receiving module, stored in memory at a network node, that receives a packet from another network node within the network;
- an identification module, stored in the memory at the network node, that identifies, within the packet, a label stack that includes a plurality of labels that collectively represent at least a portion of a label-switched path within the network;
- a label module, stored in the memory at the network node, that pops, from the label stack, a label that corresponds to a next hop of the network node included in the label-switched path;
- a determination module, stored in the memory at the network node, that determines that the next hop has experienced a failure that prevents the packet from reaching a destination via the next hop;
- wherein the identification module identifies a backup path that:
  - merges with the label-switched path at a next-to-next hop included in the label-switched path; and
  - enables the packet to bypass the failed next hop and reach the destination;
- a forwarding module, stored in the memory at the network node, that forwards the packet to the next-to-next hop via the backup path;
- an additional receiving module, stored in additional memory at the next-to-next hop, that receives the packet from a bypass network node included in the backup path;
- an additional identification module, stored in the additional memory at the next-to-next hop, that identifies, within the label stack of the packet, a further label that corresponds to a next-to-next-to-next hop included in the label-switched path;
- an additional label module, stored in the additional memory at the next-to-next hop, that pops the further label from the label stack of the packet; and
- an additional forwarding module, stored in the additional memory at the next-to-next hop, that forwards the packet to the next-to-next-to-next hop toward the destination; and
- at least one physical processor configured to execute the receiving module, the identification module, the label module, the determination module, and the forwarding module.

13. The system of claim 12, wherein the label module assigns the label to the next hop such that any packet whose label stack includes the label assigned to the next hop is forwarded to the next hop unless the next hop has failed.

14. The system of claim 13, wherein the receiving module receives a reservation message that includes labels assigned to network nodes included in the label-switched path; and
- further comprising a table module, stored in the memory at the network node, that:
  - creates a context table in connection with the next hop; and
  - records, within the context table, the labels assigned to the network nodes included in the label-switched path.

15. The system of claim 14, wherein:
- the identification module searches the context table for at least one bypass label assigned to at least one bypass network node included in the backup path by:
  - identifying, within the label stack, a subsequent label that:
    - resides subsequent to the label popped from the label stack; and
    - corresponds to the next-to-next hop included in the label-switched path; and
  - locating, within the context table, the bypass label assigned to the bypass network node included in the backup path based at least in part on the subsequent label; and
- the label module applies the bypass label to the packet at the network node prior to forwarding the packet via the backup path.

16. The system of claim 15, wherein the label module pops, from the label stack, the subsequent label that corresponds to the next-to-next hop included in the label-switched path prior to forwarding the packet via the backup path.

17. The system of claim 12, wherein the label module enables a plurality of label-switched paths to use the same label assigned to the next hop instead of assigning another label to the next hop for another label-switched path that includes the next hop.

18. The system of claim 17, wherein the label module shares the same label across the plurality of label-switched paths.

19. An apparatus comprising:
- at least one storage device that stores a plurality of labels that correspond to portions of label-switched paths within a network; and
- at least one physical processing device communicatively coupled to the storage device within a network node, wherein the physical processing device:
  - receives a packet from another network node within the network;
  - identifies, within the packet, a label stack that includes a set of labels that collectively represent at least a portion of a label-switched path within the network;
  - pops, from the label stack, a label that corresponds to a next hop of the network node included in the label-switched path;

determines, based at least in part on the label, that the next hop has experienced a failure that prevents the packet from reaching a destination via the next hop;

identifies, in response to determining that the next hop has experienced the failure, a backup path that:
   merges with the label-switched path at a next-to-next hop included in the label-switched path; and
   enables the packet to bypass the failed next hop and reach the destination;

identifies, within the label stack, a subsequent label that:
   resides subsequent to the label popped from the label stack; and
   corresponds to the next-to-next hop included in the label-switched path;

looks up a bypass label assigned to at least one bypass network node included in the backup path based at least in part on the subsequent label;

applies the bypass label to the packet at the network node; and forwards the packet to the next-to-next hop via the backup path.

\* \* \* \* \*